United States Patent [19]

Nee

[11] 4,074,106
[45] Feb. 14, 1978

[54] METHOD FOR THE AUTOMATIC MANUFACTURE OF PRESSURIZED OR LIQUEFIED GAS TANKS

[75] Inventor: Paul Nee, Dange-Saint-Romain, France

[73] Assignee: Roger Pelleray, France

[21] Appl. No.: 645,662

[22] Filed: Dec. 31, 1975

Related U.S. Application Data

[62] Division of Ser. No. 457,216, April 1, 1974, Pat. No. 3,943,615.

[30] Foreign Application Priority Data

Apr. 9, 1973 France .............................. 73.12705

[51] Int. Cl.² .............................................. B23K 9/12
[52] U.S. Cl. ................................. 219/137 R; 29/463; 113/120 S; 219/61; 219/64; 228/184
[58] Field of Search ............................... 29/33 P, 463; 113/120 R, 120 S, 120 A, 120 L, 120 N; 198/19; 219/137 R, 61, 64, 101, 104, 105; 228/15, 18, 48, 49, 173, 184

[56] References Cited

U.S. PATENT DOCUMENTS

| | | | |
|---|---|---|---|
| 1,682,403 | 8/1928 | Murray | 219/105 |
| 1,923,752 | 8/1933 | Scofield | 198/19 X |
| 2,359,775 | 10/1944 | McManus et al. | 113/120 A |
| 2,421,460 | 6/1947 | Merker et al. | 113/120 S X |
| 3,222,765 | 12/1965 | Parent et al. | 228/48 X |
| 3,531,619 | 9/1970 | Broodman | 219/137 R |
| 3,729,812 | 5/1973 | Thomas | 113/120 L X |
| 3,811,393 | 5/1974 | Close | 113/120 R |

*Primary Examiner*—J. V. Truhe
*Assistant Examiner*—N. D. Herkamp
*Attorney, Agent, or Firm*—Larson, Taylor and Hinds

[57] ABSTRACT

In a method for the manufacture of substantially cylindrical pressurized or liquefied gas tanks first and second portions deformable to open-ended cylindrical shape are stamped out of a same metal sheet, the cylindrical portions then being welded together by their free edges which mated in the sheet. A machine for automatically carrying out the method comprises means for stamping, shaping and assembling the portions.

3 Claims, 2 Drawing Figures

METHOD FOR THE AUTOMATIC MANUFACTURE OF PRESSURIZED OR LIQUEFIED GAS TANKS

This is a division, of application Ser. No. 457,216 filed Apr. 1, 1974, now U.S. Pat. No. 3,943,615.

The invention relates to the manufacture of cylindrical fluid containers from metal sheets. It relates more particularly to a method for the automatic manufacture of such containers which are to contain pressurized or liquefied gases. It also relates to a machine for the manufacture of such fluid containers which have a base support and an upper opening.

The invention applies preferably but not exclusively to the manufacture of containers which will contain propane or butane gas.

Hitherto in the manufacture of such containers or cylinders, the various operations have been performed separately, comprising more particularly the steps of cutting the metal sheets, stamping the sheets, assembling by welding the two parts of the container or cylinder produced by stamping, assembling the base support, drilling an opening for fixing the reception collar of the operating valve for the cylinder, the heat treatment and finish (particularly painting) of these containers or cylinders.

As these operations are performed at different places, it is necessary to transport the cylinder blanks to these different places for each stage of manufacture. Therefore a large labour force is necessary for this transportation and these separate operations.

Moreover, each part of the cylinder is generally made from different metal sheets which has the serious disadvantage that in this way the homogeneity of each cylinder cannot be guaranteed, leading to a danger of a large number of faulty cylinders. In addition, after stamping the blanks are generally kept for some time before continuing the cylinder assembly operation, so that the thus stamped metal is subject to ageing leading to a danger of cracks forming.

An object of the invention is to obviate the above-indicated disadvantages, and more particularly to provide a method and a machine for the automatic manufacture, without manual intervention, of such containers from metal rolls, strips or sheets.

Another object of the invention is to provide a method for the automatic manufacture of such containers which ensures the production of homogeneous containers with a better guarantee of solidity than the containers manufactured hitherto. The invention provides a method for the manufacture of pressurized or liquefied gas tanks from metal sheets, whereby the said tank is substantially cylindrical, wherein for the automatic manufacture of said containers it comprises in combination the following steps:

a first and second portion of each container is stamped into a metal sheet, whereby the said first and second portions each have substantially the shape of a cylinder open at one end and whereof the free edges substantially form a cross-section of the said cylinder, these first and second portions being made from the same metal sheet, for each container, and, the free edges of each open end of the said first and second portions coming from one and the same metal sheet are assembled by welding.

The invention also provides a machine for the manufacture of substantially cylindrical fluid containers from metal sheets whereby the said containers have a base support and an upper opening, wherein it comprises in combination:

means for producing by stamping from a first and a second piece of sheet metal (preferably from the same metal sheet) respectively a blank of a first and a second portion of each container, whereby the said substantially identical blanks each have the shape of a cylinder open at one end, whereof the free edges substantially form a cross-section of the said cylinder, whereby the said first portion will serve as the lower portion of the said container, and the second portion will serve as the upper portion of the said container, means for shaping the first and second portions of the container from the said blanks, means for assembling by welding the said free edges of the open ends of the first and second portions of the container, first transfer means for transporting the said blanks from the stamping means to the shaping means, and second transfer means for transporting the said first and second portions from the shaping means to the assembly means, the said shaping means comprising an assembly of first and second shaping devices adapted to effect the differentiated operations for producing respectively the first and second portions, the said machine also having a transport line along which are successively installed said means and devices, the above-indicated first devices of the shaping means being installed in positions symmetrical to said second devices relative to an axis which is parallel or coincides with the said transport line, the said shaping means comprising a transfer member for successively transporting according to a given rhythm which is identical on both sides of the transport line the said blanks between the first shaping devices and between the second shaping devices.

Preferably the first transfer means comprise a separation device adapted so as to transport from each side of said transport line the blank pairs coming from the same metal sheet to the said shaping means.

Advantageously the stamping means comprise a cutting device for the metal sheets and a device for stamping the cut metal sheets.

Other and further objects of the present invention will be apparent from the following description and claims, and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the scope of the appended claims.

Figure 1:
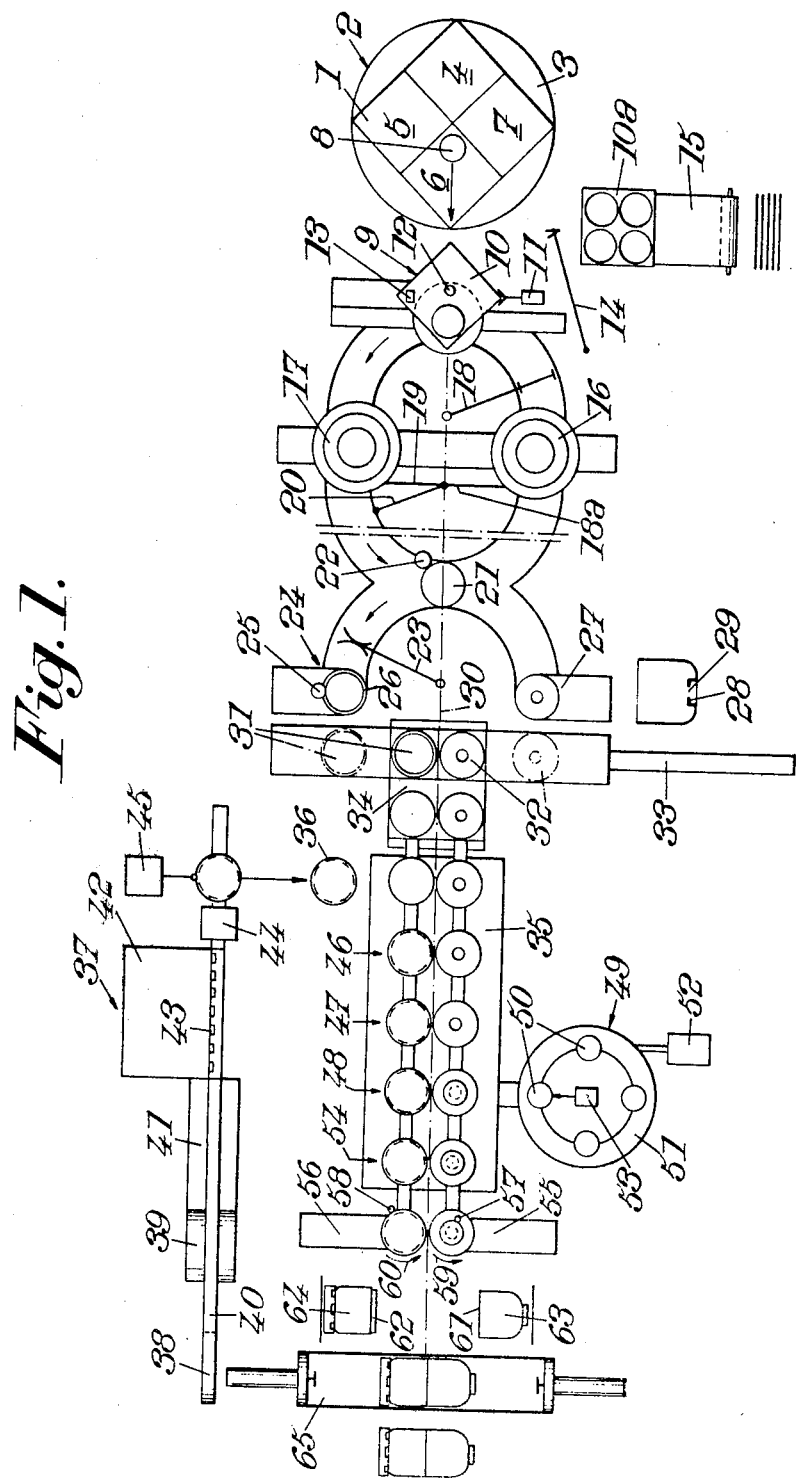
FIG. 1 shows in schematic manner the first part of the machine according to the invention.

The embodiment of the invention shown in the drawings relates to the manufacture of metal propane or butane gas cylinders containing about 13 kg of these gases in the liquefied state. These cylinders are generally used in flats and are manufactured in large number. It is therefore advantageous to have an automatic manufacturing machine for such cylinders.

Figure 2:
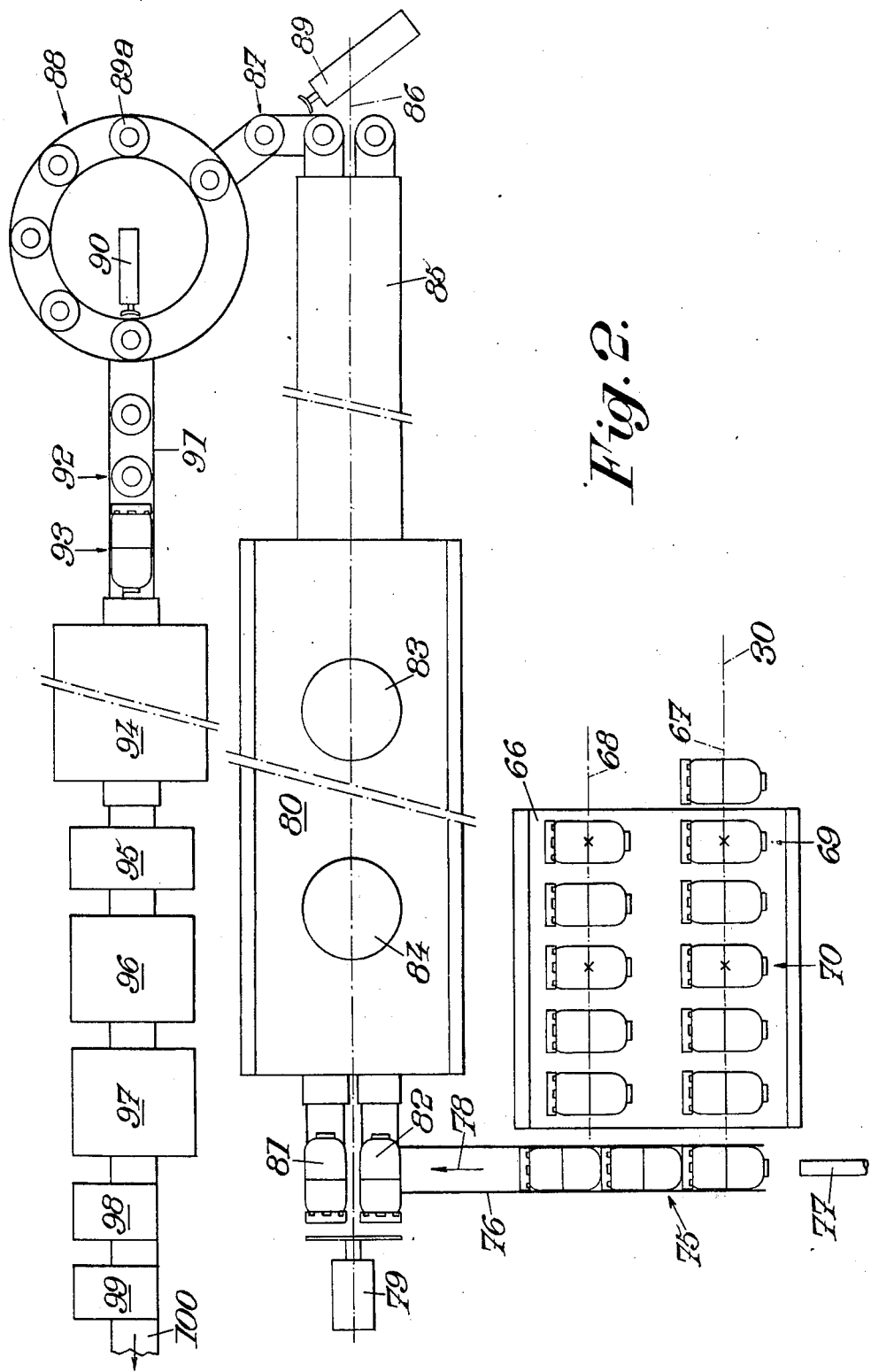
FIG. 2 shows in schematic manner the second part of the machine according to the invention.

The machine shown in FIGS. 1 and 2 permits the entirely automatic manufacture of such cylinders from metal sheets 1. Thus, once this machine is started up with the metal sheets 1 placed on the appropriate distribution device 2, the said machine performs all the operations necessary for the manufacture of the cylinders without manual intervention, and at the outlet (FIG. 2) of this machine finished cylinders are obtained. It is then merely necessary to fill the said cylinders with liquefied gas to be able to distribute them to users.

In the example the distribution device 2 comprises a circular plate 3 which is able to pivot about a vertical axis passing through the center of said plate. The upper portion of this plate is sub-divided into four quadrants or segments, respectively 4, 5, 6 and 7, in each of which are stacked the metal sheets 1 which will serve for the manufacture of the cylinders. These metal sheets all have the same dimensions, both as regards the plan dimensions and the thickness. The number of metal sheets placed in quadrants 4, 5, 6 and 7 is sufficient to ensure that the machine can operate for a relatively long time, for example, one day, without it being necessary to insert a new batch of metal sheets in the quadrants. A first transfer member comprising, for example, a system of air holes 8 raises the sheets one by one to bring them successively into a cutting press 9, wherein from a metal sheet 10 are cut four circular plates or disks which will serve as the lower and upper portions of two cylinders.

The cutting press 9 also has a die, a centering member 11 for sheet 10, and a device 12 which pivots each sheet 10 by a quarter of a turn whenever one disk has been cut from the said sheet 10. Therefore device 12 pivots each sheet 10 three times by a quarter of a turn on each occasion. In addition there is a punch which by dying forms references or directions 13 on each disk which is intended to form half the cylinder.

It should be noted that in one variant the distribution of the metal sheets is effected with the aid of a roll which is firstly unwound and then cut in regular manner into plates, which are then introduced into the cutting press 9. As a variant, the transfer member which permits the transportion of the metal plates from the distribution device 2 up to press 9 has, in place of air holes, a magnetic member or any other gripping member.

The metal plates 10a wherein are cut four disks are discharged from the press 9 with aid of a transfer arm 14 towards a removing conveyor belt 15 which transports the perforated plates 10a one by one to a storage point.

The disks cut in plates 10 drop beneath press 9 and are transported in alternate manner towards two stamping presses, respectively 16 and 17.

These stamping presses 16 and 17 form from the said disks stampings or blanks of half-cylinders, whereby the shape of these blanks is substantially cylindrical and open at one of the ends of the cylinder, each upper half being identical to the others. Press 16 is intended for producing by stamping the upper half of each cylinder, each of the lower half being identical to the others, whilst press 17 is intended to produce by stamping the lower half of each cylinder.

The transportation in alternate manner of the disks from press 9 to presses 16 and 17 is effected with the aid of an arm 18. More precisely arm 18 rotates a disk by about 90° to bring it into the stamping press 16, then the said arm 18 returns at the level of press 9 to take up another disk, and again rotates the same by about 90° but in the reverse direction from the previous disk towards stamping press 17.

Extraction members, respectively 18a and 19, are provided for each stamping press 16 and 17 which extract from the said presses the stampings.

A transfer arm 20 transports the identical stampings extracted by members 18a and 19 from presses 16 and 17 to a machine 21 for cutting the free edges of the open ends of the said stampings.

Arm 20 coupled to member 19 extracts a stamping from press 17 and performs a rotation towards machine 21 where it deposits the transported stamping, then continues its rotation in the same direction towards press 16 where, coupled once again to member 18a, it extracts another stamping from press 16. This stamping from press 16 is in turn brought towards cutting machine 21 by the said arm 20.

In the example this cutting machine 21 permits the rotation of each stamping between two cutters 22 in order to cut the free edges of the open ends of each stamping so that the said edges form cross-sections of the cylinders.

It is to be noted that for ease of comprehension of the drawings, the stampings and the sheet metal plates from which they are obtained are not shown on the same scale. The stampings are, in fact, shown on a larger scale.

Another transfer arm 23 transports the stampings produced in press 17 from machine 21 to a shaping (or joggling) device 24. This shaping device gives the free edge of the stamping which will serve as the lower portion of the cylinder an external diameter which is slightly smaller than the initial internal diameter of the stamping.

The object of this operation is to permit the assembly by nesting of the stampings for the purpose of welding the same. The said operation is performed by means of a roller 25 which rotates about the said free edge of stamping 26 (produced by press 17).

According to a variant, stamping 26 is rotated whilst cutter 25 is stationary.

As regards the variants, it is pointed out that up to the outlet of machine 21 all the operations performed are identical for all the half-cylinders. It is therefore possible to have only a single stamping press (16 or 17). It is also possible to have a press which simultaneously performs the cutting operations for sheet 10 and the stamping operation for the thus cut disks.

Arm 23 also transports the stampings produced in press 16 from cutting machine 21 to a device 27 which is able to give the upper stamping the necessary shape for receiving a collar, which forms, in per se known manner, the upper portion of the cylinder and which is intended to receive the reducing valve and the outlet taps. The device 27, as shown in FIG. 1, makes it possible to produce a recess 28 at the top of the upper stamping and drill a hole 29 around the center of the said recess 28.

It should be noted that the sequence of transfer operations from press 9 to devices 24 and 27 is effected in such a way that the stampings which simultaneously reach devices 24 and 27 necessarily come from the same plate 10.

It is important to note that devices 24 and 27 which perform the different operations on the stampings are positioned symmetrically relative to a line 30 so that one deals with the lower portion of the cylinder, and the other deals with the upper portion of the said cylinder.

Right up to the assembly of the upper and lower portions all the manufacturing operations of the said upper and lower portions are effected in simultaneous manner, and in symmetrical positions relative to the said line 30. Hereinafter line 30 is designated the "transport line."

In addition it is pointed out that arms 18, 20 and 23 pivot via one of their ends about a vertical axis passing through line 30. The other end of each of these arms comprises means for gripping the blanks.

After devices 24 and 27 have completed their respective operations, the upper and lower blanks are transported parallel to line 30 up to positions which are also symmetrical relative to the line 30. In these positions the lower blank 31 and upper blank 32 are moved towards the said line 30.

This displacement in a direction perpendicular to line 30 is effected, for example, with the aid of jack members 33. The lower portion 31 and upper portion 32 at this stage are arranged in such a way that their opening forming the cross-section is directed upwards. Whilst being advanced parallel to line 30, said portions 31 and 32 are simultaneously rocked by means of a rocking member 34 in such a way that their opening forming a cross-section is directed downwards.

Once this rocking movement has been performed, said upper and lower portions are introduced still in simultaneous manner onto a conveyor belt 35 which moves the said portions 31 and 32 along transport line 30.

All the operations necessary for finishing the said upper and lower portions prior to their assembly by welding are performed on belt 35.

Belt 35 periodically transports the upper and lower portions of the cylinder by a predetermined length, whereby this length is a given fraction of the total length of belt 35.

The first operation performed on belt 35 consists of placing on the sealed top of the lower portion of the cylinder, which will form the base of the cylinder, a collar 36 which will form a base support of the cylinder. In the present example this base support 36 is manufactured by a device 37 installed on the same frame of the manufacturing machine as the cylinder itself.

This device 37 manufactures the said base support 36 from a coil 38 of strip or sheet metal. Device 37 comprises a roller 39 which unwinds coil 38 and which gives the substantially planar shape to the unwound strip 40, an extractor 41 which extracts the strip from the said roller 39 to bring it into a device 42 for cutting crenellations 43 on one edge of strip 40. In the example device 42 simultaneously cuts seven crenellations 43 and cuts the portion of strip 40 wherein the said crenellations 43 have been made. This strip portion is then introduced into a press 44 which in per se known manner gives the shape of a circular collar to the said strip portion by means of a certain number of successive operations. The ends of the portion of the crenellated strip joined by press 44 are then welded by means of a first welding station 45.

The collar 36 produced in this way by device 37 is then moved towards line 30, e.g. with the aid of jacks (not shown), and is arranged on the lower portion of the cylinder.

The second operation performed on belt 35 consists of a washing operation for the said upper and lower portions. It is in fact necessary to wash the stampings prior to the various welding operations which must be performed thereon. The washing operation is performed at station 46 by projecting a washing mixture by means of the not shown washing ramps. The next station 47 is a rinsing station which is also effected by projecting liquid, e.g. water. After station 47 the upper and lower stampings are transported by belt 35 to station 48. At station 48 the collar mentioned hereinbefore is placed on the upper stamping. To this end a distributor 49 is provided wherein the collars 50 have been previously placed. This distributor 49 comprises a circular table 51 which is able to rotate about a vertical axis by means of a drive member 52. Collars 50 are arranged in groups on the said table. To place the collars one by one on the said upper stampings, a device 53 is provided which moves the said collars towards station 48.

In the penultimate station 54 of belt 35 the upper and lower stampings are dried by blowing in hot air. Level with station 54 it is advantageous to provide a tunnel above belt 35 so that the drying by blowing in hot air is more effective.

On being discharged from belt 35 the upper and lower stampings are arranged in welding stations 55 and 56 which, as has been stated hereinbefore, are arranged symmetrically to line 30.

At welding station 55 the collars are welded to the upper stampings, and at welding station 56 the base supports 36 are welded to the lower stampings. The welding operations are, for example, performed by means of arc welding torches 57 and 58 using a solid or gaseous flux, whereby the said torches produce substantially in punctiform manner. For welding the base supports and collars the upper and lower stampings are rotated about the axis of the cylinder from which they are made in the directions indicated by the arrows, respectively 59 and 60 in FIG. 1.

After the said welding operations the upper and lower stampings which are at this stage provided respectively with a collar and a base support are swung in such a way that their axes are horizontal, having been vertical up to stations 55 and 56. The stampings are also turned in such a way that their free edges are facing but their axes are maintained in the horizontal plane. In this way the said free edges 61 and 62 of upper stamping 63 and lower stamping 64 face one another.

After this swinging and turning operation, stampings 63 and 64 are transported parallel to line 30 into a jack device 65 provided for the assembly along their free edges and which at this stage form the lower and upper portions of the cylinder.

Assembly device 65 assembles the said lower and upper portions by nesting edge 61 on edge 62.

After their assembly the cylinders are transported towards a carriage 66 (reference should now be made to FIG. 2), whereon are performed the various welding operations of the upper and lower portions of each cylinder.

In the example this carriage can perform a translational movement in the direction perpendicular to line 30 in such a way as to be able to assume two positions. In the first of these positions the cylinders can be introduced in a row according to axis 67 on one side of the carriage, and in the second position the cylinders can be introduced in a second row according to axis 68 parallel to axis 67 on the other side of the carriage. In other words, axes 67 and 68 can alternately extend line 30. In the position as shown in FIG. 2, it is axis 67 which extends the said transport line 30.

On carriage 66 the welding operations are performed in two separate stations, respectively 69 and 70. According to the invention, the welding operation of the free edges of the upper and lower halves of each cylinder are performed in two steps. During the first step of this welding operation performed at station 69 the intensity of the electrical current is relatively small, and during the second step of the welding operation performed at station 70 the intensity of the electrical current is substantially higher than that used at station 69. The inventor has, in fact, found that this two-step welding operation with electrical currents of different intensities makes it possible to obtain welds making the cylinders perfectly sealed. Preferably the second welding operation with a higher electrical current is performed after the first operation.

At the end of carriage 66 the cylinders wait for a given time which is adequate for the operator to check, e.g. by visual observation whether the welds have been made in a correct manner at stations 69 and 70.

At the end of carriage 66 the cylinders are discharged therefrom in the direction of line 30 to a device 75 for transferring them to the heat treatment and finishing stations.

It will be understood that the discharge of the cylinders from carriage 66 can be performed at the same time as loading at the other end of the carriage for the same row (axis 67 or 68).

Discharge device 75 comprises a guidance path 76 for the cylinders discharged from carriage 66. This discharge device 75 also comprises a thrust member 77, e.g. a jack, which forces the cylinders onto the guidance path 76 in the direction indicated by arrow 78 in FIG. 2.

At the outlet of guidance path 76 the cylinders are turned in such a way that their axis is parallel to line 30 and an introduction device 79 which is also a jack introduces the said cylinders into a heat treatment furnace 80, more particularly an annealing furnace. In the predetermined example the cylinders are introduced in pairs (cylinders 81 and 82) into furnace 80.

For reasons of clarity in FIG. 2 only the longitudinal ends of furnace 80 are shown, the central portion thereof having been omitted.

Furnace 80 has upper openings 83 and 84 in the form of a tower which form the exhaust flues for the said furnace 80.

The outlet of furnace 80 is connected directly without contact with the outside to the inlet of a cooling duct 85. Cooling duct 85 comprises, for example, pipes (not shown) in which water circulates. The heat recovered by the water circulating in the said pipes can optionally be used for other operations. As in the case of furnace 80, in FIG. 2 only part of the length of said duct 85 is shown.

Within furnace 80 and duct 85 a conveyor belt is provided to convey in the horizontal position the cylinders from the furnace inlet to the duct outlet. At the outlet of duct 85 the cylinders are raised by a not shown device.

After the cylinders have been removed from the cooling duct 85 and raised, they are moved perpendicular to axis 86 of furnace 80 and duct 85, and are deposited at a station 87 where they are filled with water via their upper portion which has a collar. At the end of this filling operation the cylinders are placed on a test plate or the like 88. The transfer of the cylinders from station 87 to plate 88 is effected by means of a jack-operated thrust device 89.

All the operations necessary for checking the pressure resistance of the cylinders is performed on test plate 88 which can rotate about a vertical axis. These checking operations consist in particular of pressurizing the cylinders at station 89a. The various checking stations have fixed positions relative to plate 88 which, as already indicated, can rotate about a vertical axis so as to be able to move the cylinders from one checking station to another.

After the checking operations the cylinders are removed from plate 88 by means of a jack 90, which moves the cylinders towards a pipe 91 along which is provided a station 92 where the water introduced into the cylinders at station 87 is emptied.

Along pipe 91 beyond station 92 is provided a station 93 for turning over the cylinders. At this station the cylinders are laid flat so that their axis is horizontal and parallel to the axis of pipe 91.

The transfer devices from pipe 91 bring the horizontally positioned cylinders from station 93 to the entry point of a chamber 94 wherein the outer surface of the cylinders is treated. This treatment consists of sandblasting or shotting. For reasons of clarity FIG. 2 only shows part of the length of chamber 94.

Following on the external surface treatment of the cylinders they are introduced into a metallization cabin 95, whereafter the cylinders are raised by a not shown device and then installed in a painting cabin 96. Following on the painting cabin 96 is provided a furnace 97 wherein the drying or baking of the paint applied in cabin 96 is carried out.

The cylinders are then removed from furnace 97 and arranged at station 98 where the reducing valve and taps are fitted on the collar, welded (at station 55 in FIG. 1) to the upper portion of the said cylinders. Manufacture of the cylinder is then completed and it is possible to provide a station 99 where the cylinders are automatically filled with propane or butane gas.

Finally, a device 100 for the discharge of the thus filled cylinders to a storage area is provided.

Although not described in detail, control devices which can be easily realized by the skilled expert are provided which permit the performance according to the sequences described hereinbefore of the various devices which go to make up the machine according to the invention.

The process and machine according to the invention described hereinbefore can be used whenever it is desired to manufacture containers having at least two main portions manufacturable by stamping metal sheets. This method and this machine are particularly advantageous for the manufacture of containers which are to receive liquefied gases or gases at a pressure above atmospheric pressure.

While there has been described and illustrated the preferred embodiments of the invention, it is to be understood that these are capable of variation and modification, and it is not therefore desired to be limited to the precise details set forth, but to include such modification and alternations as fall within the scope of the appended claims.

We claim:

1. In a method for manufacturing pressurized or liquefied gas tanks or containers which comprise two substantially cylindrical parts closed at one end and open at the other end, the free edges of the cylindrical parts substantially defining the cross-section of the tanks or containers and said two parts being welded to each other, the improvement comprising the following steps:
   cutting two metal blanks simultaneously from a single metal sheet;
   stamping said blanks simultaneously at two separate stations so as to form said two substantially cylindrical parts; and
   assembling said two substantially cylindrical parts by welding the cylindrical parts together along the free edges of the said open ends of said cylindrical parts.

2. A method as claimed in claim 1, wherein the said assemblying by welding step comprises first and second welding steps using electric arc welding, the first of these steps being performed with an electrical current having a first intensity, and the second step being performed with an electrical current having a second intensity, the second intensity being substantially higher than the first.

3. A method as claimed in claim 1 wherein pressure resistance tests are performed on the tank or container prior to giving an external finish to the surface of said tank or container.

* * * * *